(12) United States Patent
Ben-Zvi et al.

(10) Patent No.: US 6,635,342 B1
(45) Date of Patent: Oct. 21, 2003

(54) SOLAR CONTROL PIGMENTED THERMOPLASTIC POLYMER SHEET

(75) Inventors: Guy Ben-Zvi, Kibbutz Ranat Yohanan (IL); Fabian Rios, Kibbutz Ramat Yohanan (IL)

(73) Assignee: Paltough Industries (1998) Ltd., Yochanan (IL)

( * ) Notice: Subject to any disclaimer, the term of this patent is extended or adjusted under 35 U.S.C. 154(b) by 0 days.

(21) Appl. No.: 09/762,483

(22) PCT Filed: Mar. 15, 1999

(86) PCT No.: PCT/IL99/00144

§ 371 (c)(1),
(2), (4) Date: Feb. 7, 2001

(87) PCT Pub. No.: WO00/09312

PCT Pub. Date: Feb. 24, 2000

Related U.S. Application Data

(60) Provisional application No. 60/096,531, filed on Aug. 13, 1998.

(51) Int. Cl.[7] .................................................. B32B 5/16
(52) U.S. Cl. .................. 428/323; 428/328; 428/412; 427/398.1; 427/407.1; 264/1.3; 264/1.9; 264/2.7; 264/108; 264/134; 264/291; 264/292; 264/510; 264/553
(58) Field of Search ................................ 428/323, 328, 428/412; 427/407.1, 398.1; 264/1.9, 2.7, 291, 292, 510, 553, 1.3, 108, 134

(56) References Cited

U.S. PATENT DOCUMENTS

| | | | |
|---|---|---|---|
| 4,544,600 A | 10/1985 | Kern | 428/323 |
| 4,976,896 A | * 12/1990 | Short et al. | |
| 5,104,210 A | * 4/1992 | Tokas | 359/296 |
| 5,358,669 A | * 10/1994 | Demiryont et al. | |
| 5,558,705 A | 9/1996 | Keemer et al. | 106/403 |
| 5,773,492 A | 6/1998 | Ferguson | 523/171 |
| 5,812,300 A | * 9/1998 | Coleman | 359/265 |
| 5,867,316 A | * 2/1999 | Carlson et al. | 359/500 |
| 5,991,077 A | * 11/1999 | Carlson et al. | 359/500 |
| 6,005,713 A | * 12/1999 | Carlson et al. | 359/500 |
| 6,031,665 A | * 2/2000 | Carlson et al. | 359/494 |
| 6,325,847 B1 | * 12/2001 | Christie et al. | 106/417 |

FOREIGN PATENT DOCUMENTS

DE   195 20 062   2/1996

* cited by examiner

Primary Examiner—Leszek Kiliman
(74) Attorney, Agent, or Firm—Eitan, Pearl, Latzer & Cohen Zedek, LLP.

(57) ABSTRACT

A solar control light transmitting thermoplastic polymer sheet is provided which contains flakes of metal pigment that are aligned coplanar with the upper face of the sheet. The sheet transmits a controlled amount of light while reflecting a significant amount and absorbing the rest. In an alternative, the sheet has a co-extruded second layer of UV-protective thermoplastic polymer formed on top of the first layer.

22 Claims, 4 Drawing Sheets

SOLAR CONTROL PIGMENTED THERMOPLASTIC POLYMER SHEET

CROSS REFERENCE TO RELATED APPLICATIONS

This application claims priority from PCT International Application No. PCT/IL99/00144, filed Mar. 15, 1999, entitled "A SOLAR CONTROL PIGMENTED THERMOPLASTIC POLYMER SHEET" which in turn claims benefit from U.S. Provisional Application Ser. No. 60/096,531, filed Aug. 13, 1998 and entitled "A SOLAR CONTROL POLYCARBONATE SHEET".

FIELD OF THE INVENTION

The present invention relates to outdoor building materials, in general, and to solar control thermoplastic polymer sheets for roofing and cladding, in particular.

BACKGROUND OF THE INVENTION

In the industrial and residential building sectors there is an existing market for light-transmitting sheet materials that allow natural light to enter the building or covered space One of the requirements for light-transmitting sheets for building is a service temperature of up to 80–90° C. and down to −30° C. Furthermore, the sheet should be UV resistant for 20–50 years in extreme radiation conditions, an issue which is made more important by the ozone hole problem. The light transmission (LT %) should be controllable, with typical values of 15–50%. The sheet should have a low Total Solar Transmission ($ST_t$), which is the percent of incident solar radiation transmitted by the sheet, including both the solar transmission and the part of the solar absorption reradiated inward. As well, the sheet should have a low Shading Coefficient (SC), which is a measure of the total solar transmission relative to that of standard glass. Preferably, the ratio of LT % to $ST_t$ of the sheet is high, signifying maximum light transmission with minimum heat. Finally, the sheet should be resistant to corrosion and environmentally friendly.

Existing light-transmitting sheets are shown in FIGS. 1A, 1B, 1C and 1D, to which reference is now made. FIG. 1A is a schematic illustration of a cross-section of a prior art sheet 10 which is clear and not tinted. The sheet 10 is composed of clear, untinted material 12 such as polycarbonate (PC), polyvinylchloride (PVC) or fiberglass. The sheet 10 allows most of the incident ultraviolet (UV), visible and near infrared (NIR) radiation, shown as solid lines, to pass through it unabsorbed. However the transmitted solar radiation, shown as dashed lines, then heats the covered space under the sheet 10, which causes thermal stress on people and increases the work to be done by air conditioning systems.

FIG. 1B is a schematic illustration of a cross-section of a prior art, sheet 14 which is clear and tinted, the sheet material comprising a clear polymer 16 with an absorbing pigment 18. Examples of the sheet material are tinted glass and tinted PC. Some of the incident radiation, shown by solid lines, is absorbed by the pigment 18 and some is transmitted. The transmitted radiation, shown by dashed lines, heats the covered space. The absorption, shown by squiggles, causes the temperature of the sheet itself to rise. The heated sheet subsequently remits the energy at far infrared (FIR) wavelengths, as shown by the curvy lines. The portion of the reemitted FIR radiation transmitted inward contributes to further heating of the covered space.

FIG. 1C is a schematic illustration of a cross-section of a prior art glass sheet 20, coated with a reflective coating 22 that reflects part of the incident radiation, shown by solid lines, rather than absorbing it. A protective layer 24 coats the reflective coating 22, and protects it from corrosion. However, the reflective coating 22 is still susceptible to corrosion on the edges of the sheet 20 and on the surface in the event that some of the protective layer 24 has been removed, scratched or dented. Reflective glass is brittle and is unavailable as a corrugated roofing material.

FIG. 1D is a schematic illustration of a cross-section of a prior art plastic sheet 20', coated with a metallic coating 22' that reflects part of the incident radiation, shown by solid lines, rather than absorbing it. A protective layer 24' coats the metallic coating 22', and protects it from corrosion. However, the metallic coating 22' is still susceptible to corrosion on the edges of the sheet 20' and on the surface in the event that some of the protective layer 24' has been removed, scratched or dented. The metallic coating 22' can be applied to flat lo sheets only and cannot be applied to corrugated sheets.

German Patent DE19520062 to Moench describes a method of manufacturing a plastic sheet using metal particles, the resulting sheet reflecting IR rays but allowing visible light and UV rays to pass through it. Moench describes aluminum or bronze as the ideal choice for the metal particles. There are several problems with sheets according to Moench. First of all, it is well known in the art that aluminum reflects IR, visible and UV light in the same proportion. Therefore, it is not possible that a plastic sheet containing particles of aluminum will selectively reflect IR light and let visible and UV light to pass through it. Bronze will reflect slightly more IR light than it reflects visible and UV light, but the difference from aluminum is not significant. Secondly, the purpose of the sheet is as a transparent building material that controls how much the building is heated by light However, it is well known that all light entering a building, IR, visible and UV will contribute to the heat inside the building. Therefore, a sheet according to Moench which is permeable to visible and UV light will still contribute to the heat inside the building. Thirdly, the metal particles according to Moench are spherical, which have low reflectance efficiency.

SUMMARY OF THE INVENTION

It is an object of the present invention to provide a light-transmitting, thermoplastic polymer sheet material that can be used as an outdoor building material and which overcomes the limitations and disadvantages of existing materials.

There is provided in accordance with a preferred embodiment of the present invention a rigid light transmitting thermoplastic polymer sheet having an upper face. The sheet includes transparent thermoplastic polymer having flakes of metal pigment dispersed therein. The flakes are oriented coplanar to the upper face.

There is also provided in accordance with another preferred embodiment of the present invention a rigid light transmitting thermoplastic polymer sheet including a first transparent thermoplastic polymer layer and a second UV-protective transparent thermoplastic polymer layer co-extruded with the first layer. The second layer is formed on top of the first layer. The sheet also includes metal pigment dispersed within at least one of the first and second layers.

In accordance with a preferred embodiment of the present invention, the metal pigment is dispersed within the first transparent thermoplastic polymer layer.

Alternatively, in accordance with a preferred embodiment of the present invention, the metal pigment is dispersed within the second UV-protective transparent thermoplastic polymer layer.

Furthermore, in accordance with a preferred embodiment of the present invention, the thermoplastic polymer is one of a group including: polycarbonate (PC), polyvinylchloride (PVC), polymethylmethacrylate (PMMA), polyethylenterphtalateglycol (PETG) and polystyrene (PS).

Additionally, in accordance with a preferred embodiment of the present invention, the sheet is one of a group of a flat sheet, a corrugated sheet and a multi-wall sheet.

Moreover, in accordance with a preferred embodiment of the present invention, the sheet has an upper face and flakes of the metal pigment are oriented coplanar to the upper face.

There is provided, in accordance with a preferred embodiment of the present invention, a method for production of a rigid light transmitting thermoplastic polymer sheet, the method including the steps of treating metal pigment flakes thereby to increase their surface energy, and feeding a thermoplastic polymer material and the metal pigment flakes into an extrusion line, thereby forming a melt. The method includes as well the steps of extruding the melt through an extrusion die, and solidifying the melt into a rigid sheet Moreover, in accordance with a preferred embodiment of the present invention, the method of production includes the step of thermoforming the rigid sheet.

Furthermore, in accordance with a preferred embodiment of the present invention, the step of thermoforming is performed on-line or off-line.

Additionally, in accordance with a preferred embodiment of the present invention, the thermoplastic polymer material is one of a group including: PC, PVC, PMMA, PETG and PS.

There is provided, in accordance with a preferred embodiment of the present invention, a method for production of a rigid, light-transmitting thermoplastic polymer sheet, the method including the steps of treating metal pigment flakes thereby to increase their surface energy, feeding a first thermoplastic polymer material into a first extrusion line, feeding a second thermoplastic polymer material into a second extrusion line, and feeding the metal pigment flakes into at least one of the extrusion lines. The method includes as well the steps of co-extruding the first thermoplastic polymer material and the second thermoplastic polymer material into a melt, whereby the second thermoplastic polymer material forms a layer on the first thermoplastic polymer material, extruding the melt through an extrusion die, and solidifying the melt into a rigid sheet.

BRIEF DESCRIPTION OF THE DRAWINGS

The present invention will be understood and appreciated more fully from the following detailed description taken in conjunction with the appended drawings in which like reference numerals indicate similar or like components. In the drawings.

DETAILED DESCRIPTION OF THE PRESENT INVENTION

The solar control thermoplastic polymer sheet of the present invention is produced by introducing a metal pigment in the form of flakes during the manufacture of the thermoplastic polymer sheet. The metal pigment flakes transmit a controlled amount of light while reflecting a significant amount and absorbing the rest. Any suitable transparent thermoplastic polymer, such as polycarbonate (PC), polyvinylchloride (PVC), polymethylmethacrylate (PMMA), polyethylenterphtalateglycol (PETG), or polystyrene (PS), can be used. The following description refers to polycarbonate (PC) for the purposes of example only and is not limited thereto.

Figure 1B:
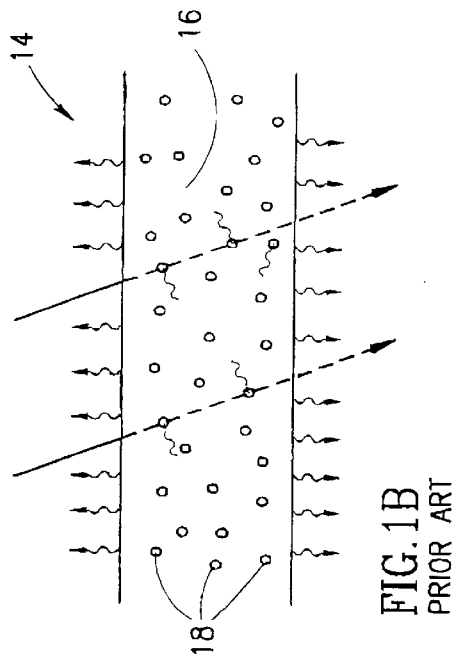
FIG. 1B is a schematic illustration of a cross-section of a prior art sheet which is clear and tinted.
Figure 1D:
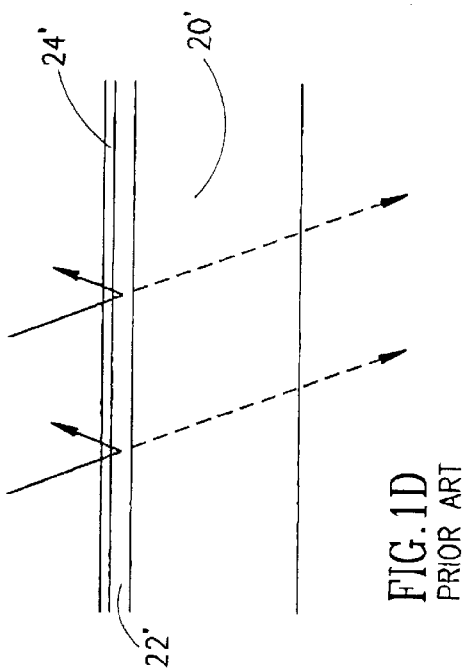
FIG. 1D is a schematic illustration of a cross-section of a prior art plastic sheet, coated with a metallic surface coating and a protective layer.
Figure 1A:
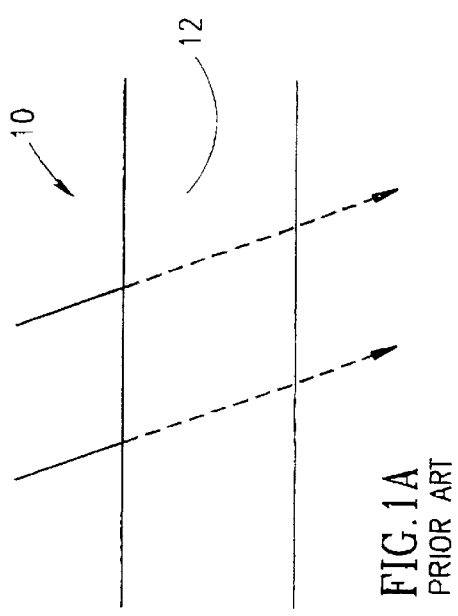
FIG. 1A is a schematic illustration of a cross-section of a prior art sheet which is clear and not tinted.
Figure 1C:
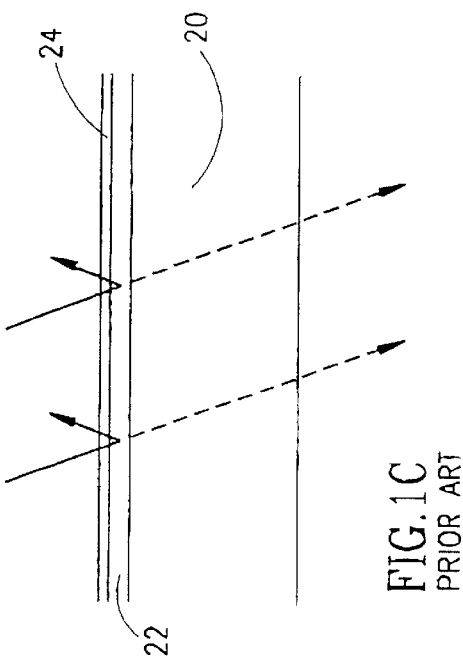
FIG. 1C is a schematic illustration of a cross-section of a prior art glass sheet, coated with a reflective coating and a protective layer.
Figure 2:
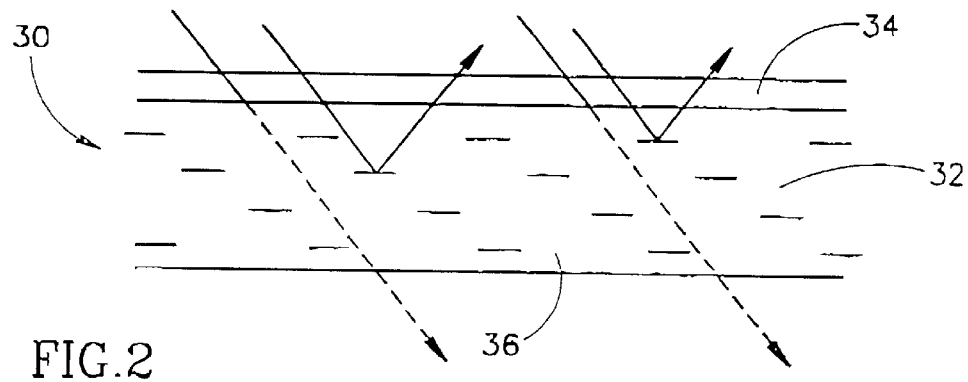
FIG. 2 is a schematic cross-section illustration of a solar control polycarbonate (PC) sheet with a skin layer of UV-protective PC, according to a preferred embodiment of the present invention.

Reference is now made to FIG. 2, which is a schematic illustration of a cross-section of a PC sheet 30, according to a preferred embodiment of the present invention. The PC sheet 30 comprises a rigid, bulk, solar control PC sheet 32 and a rigid skin layer 34 of UV-protective PC. The addition of the skin layer 34 of UV-protective PC makes the PC sheet 30 particularly suitable for outdoor use, as is known in the art.

The skin layer 34 is applied via co-extrusion, but it will be apparent to those skilled in the art that any other suitable method for applying the skin layer may be utilized. In a non-limiting example, the skin layer 34 of UV-protective PC has a thickness of 30 microns. In a preferred embodiment, a PC sheet for outdoor building is preferably composed of a 30-micron layer of UV-protective PC and a 1–2 mm layer of bulk, solar control PC.

The solar control PC sheet 32 comprises polycarbonate and particles 36 of metal pigment. Much of the incident radiation, shown by solid lines, is reflected off the metal pigment particles 36, while some is absorbed, and the rest, shown by dotted lines, is transmitted. In order to get an efficient effect of reflectance and transmittance, the size and shape of the pigment particles 36 are carefully designed and controlled, so that a minimum amount of pigment yields an optimum performance.

The optimum pigment particle 36 should be a flat and thin flake in order to achieve maximum surface reflectance with minimum material. Essentially, the particle 36 should be a flake with a high aspect ratio (diameter to thickness), for example between approximately 10:1 and 100:1. In addition, the size of the particle 36 should be less than approximately 50 microns in its longest dimension, since 50 microns is the visible limit of the unaided human eye to distinguish a particle. An apparent diameter of more than 50 microns would cause the image transmitted by the light to look dotted or stained.

However, the size of the particle 36 should also be significantly larger than the wavelengths that need to be transmitted, in order for light rays to pass efficiently without interference and in order for the reflected light to be reflected efficiently. Therefore, the size of the particle 36 should be greater than 1–2 microns.

Finally, the flakes must be oriented parallel to the sheet surface since the sheet is essentially flat, and the light is incident perpendicularly to the surface. Any particle 36 incorrectly oriented would not contribute to the reflectance, but would rather increase the absorption and therefore be a waste of expensive pigment.

Thus, the properties of the optimal particle 36 can be summarized as follows:
 a. a surface diameter of 5–50 microns;
 b. a small a thickness as possible, preferably below 1 micron, provided that the particle does not break during the manufacture of the sheet;
 c. oriented parallel to the sheet surface.

Figure 3:
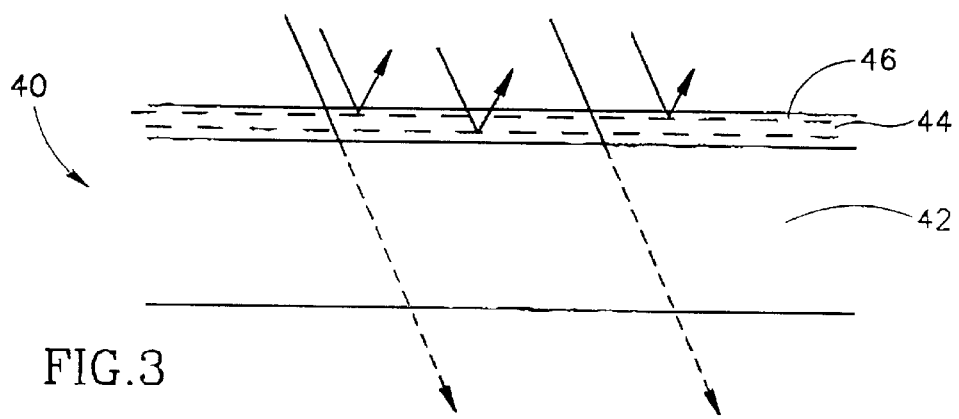
FIG. 3 is a schematic cross-section illustration of a PC sheet with a skin layer of solar control, UV-protective PC, according to another preferred embodiment of the present invention.

Reference is now made to FIG. 3, which is a schematic illustration of a cross-section of a PC sheet 40, according to another preferred embodiment of the present invention. The PC sheet 40 comprises a rigid, bulk PC sheet 42 and a rigid skin layer 44 of solar control, UV-protective PC. Due to the skin layer 44 of UV-protective PC, this embodiment of the present invention is particularly suitable for outdoor use.

The skin layer 44 is applied via co-extrusion, but it will be apparent to those skilled in the art that any other suitable method for applying the skin layer may be utilized. In a non-limiting example, the skin layer 44 of solar control, UV-protective PC has a thickness of 30 microns. In a preferred embodiment, a PC sheet for outdoor building is preferably composed of a 30-micron layer of solar control, UV-protective PC and a 1–2 mm layer of bulk PC.

The solar control, UV-protective PC layer 44 comprises UV-protective polycarbonate and particles 46 of metal pigment. Much of the incident radiation, shown by solid lines, is reflected off the metal pigment particles 46, while some is absorbed, and the rest, shown by dotted lines, is transmitted. The properties of the optimal metal pigment particle 46 are identical to those described hereinabove with reference to FIG. 3.

Figure 4:
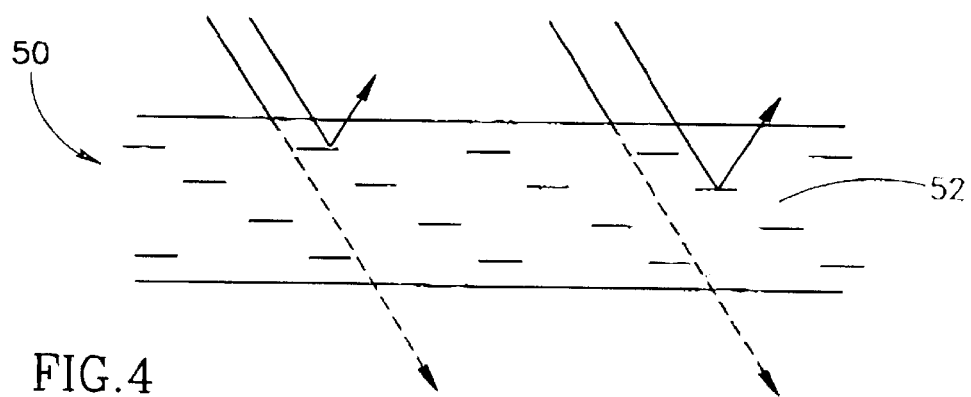
FIG. 4 is a schematic cross-section illustration of a solar control PC sheet, according to a further preferred embodiment of the present invention.

Reference is now made to FIG. 4, which is a schematic illustration of a cross-section of a rigid, bulk, solar control PC sheet 50, according to a further preferred embodiment of the present invention. The solar control PC sheet 50 comprises polycarbonate and particles 52 of metal pigment. Most of the incident radiation, shown by solid lines, is reflected off the metal pigment particles 52, while some is absorbed, and the rest, shown by dotted lines, is transmitted. Due to the lack of a skin layer of UV-protective PC, this embodiment of the present invention is particularly suitable for indoor use, when a metallic look is desired. The properties of the optimal metal pigment particle 52 are identical to those described hereinabove with reference to FIG. 3

The PC sheets 30 (FIG. 2), 40 (FIG. 3) and 50 (FIG. 4) are shown as being flat, having been extruded through a flat sheet die. It will be appreciated that any shape of sheet may be produced, depending on the die used.

It will also be appreciated that the more the pigment is concentrated near the upper surface of the PC sheet, the better the solar properties.

Figure 5:
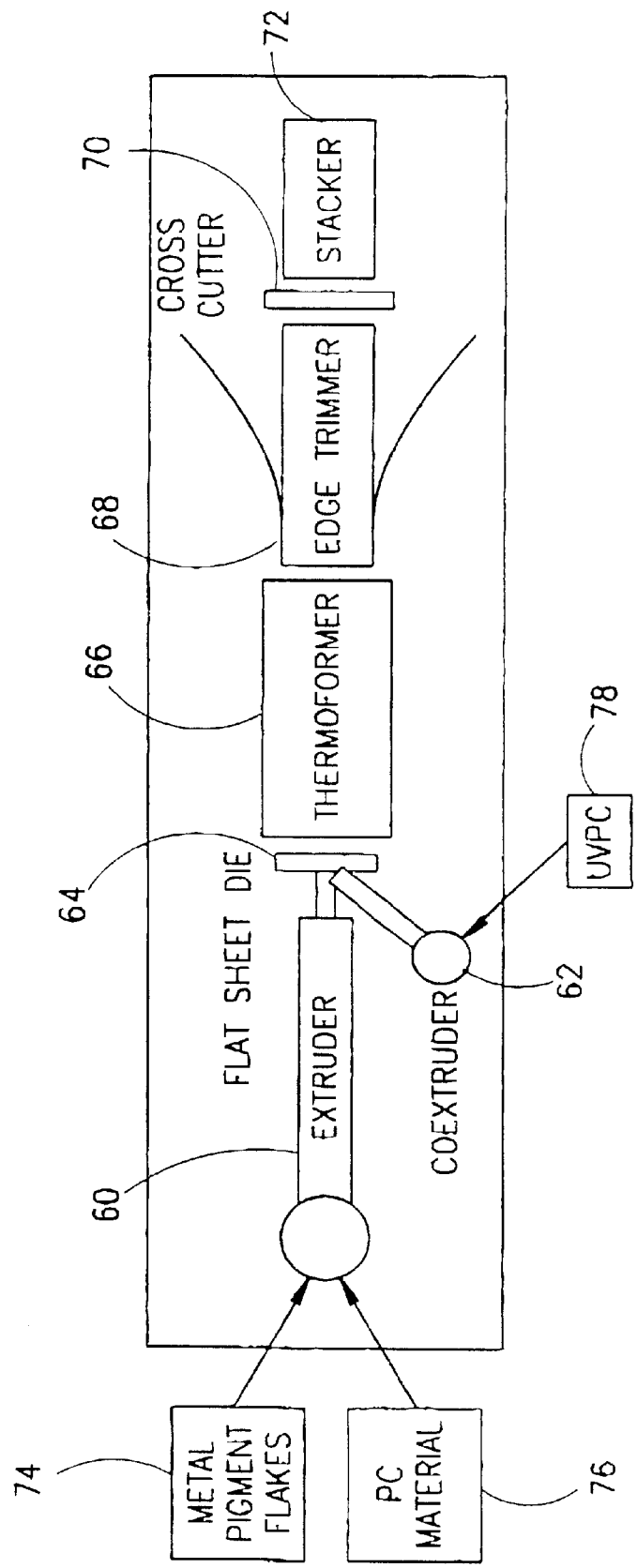
FIG. 5 is a block diagram illustration of a system for the production of the polycarbonate sheet of FIG. 2, according to a preferred embodiment of the present invention.

Reference is now made to FIG. 5, which is a block diagram illustration of a system suitable for the production of the polycarbonate sheet of FIG. 2, according to a preferred embodiment of the present invention. The system comprises an extruder 60, a co-extruder 62, a flat sheet extrusion die 64, a thermoformer 66, an edge trimmer 68, a cross cutter 70 and a stacker 72 The aforementioned components are well known in the art and will not be further described.

Figure 6:
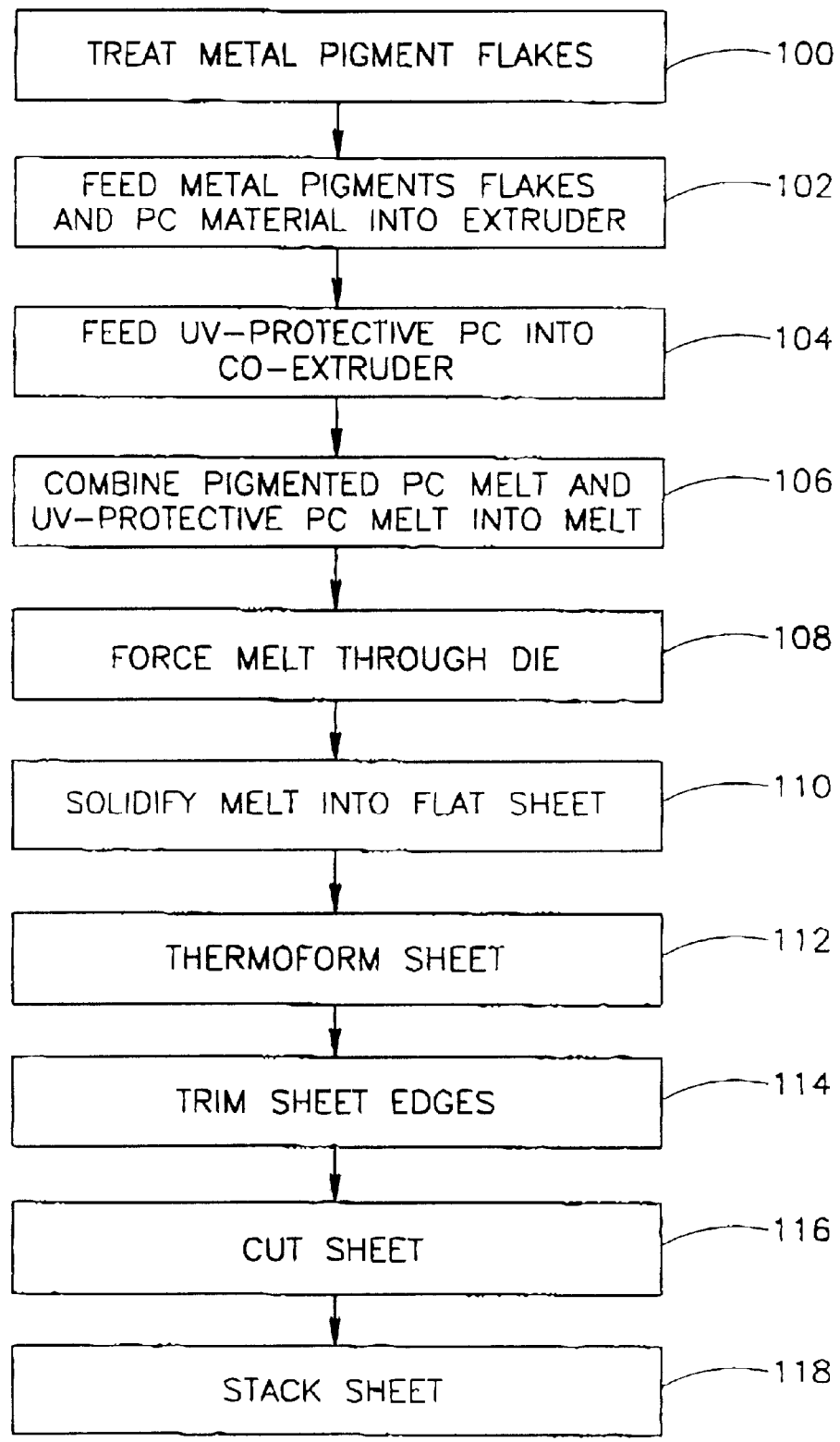
FIG. 6 is a schematic flowchart of the operation of the system of FIG. 5.

Reference is now made additionally to FIG. 6, which is a schematic flowchart of the operation of the system of FIG. 5. In operation, metal pigment flakes 74 are treated (step 100) on the outside so as to increase their surface energy. Any suitable treatment of the metal pigment flakes, such as for example the treatments described in U.S. Pat. No. 5,773,492 to Ferguson, U.S. Pat. No. 5,558,705 to Keemer et al., and U.S. Pat. No. 4,544,600 to Kern, is acceptable.

The pigment flakes 74 and a polycarbonate (PC) material 76 are then fed (step 102) into the extruder 66, creating a pigmented PC melt. The treatment of the pigment flakes 74 allows good wetting by the PC material 76 and enhances the dispersiveness of the metal pigment flakes 74 in the PC material 76. In contrast, untreated metallic powders do not readily disperse in polymer matrixes and tend to agglomerate and adversely affect mechanical properties of the polymer.

A special PC compound 78 with increased UV resistance properties is fed (step 104) into the co-extruder 62, creating a UV-protective PC melt. Proximate the exit of extruder 60, the UV-protective PC melt is combined (step 106) with the pigmented PC melt into a melt. This process, known as skin layer UV co-extrusion, is well known in the art.

The melt consisting of the pigmented PC melt and the UV-protective PC melt is forced (step 108) through the flat sheet extrusion die 64. At the exit of the melt from the extrusion die 64, the pigment flakes 74 in the pigmented PC melt are oriented in the plane of the sheet, due to the high shear rates in the lips of the extrusion die 64. This further optimizes the dispersion and effectiveness of the pigment flakes 74. The melt is then solidified (step 110) into a flat sheet. The flat sheet may be solid (single wall) or hollow (multi wall).

The flat sheet can be used as is or can be further thermoformed either on-line or off-line. On-line thermoforming alters the flat sheets into corrugated sheets. Off-line thermoforming of more complex or small size articles is a preferred method for producing roof ridges, roof tiles, flashings and accessories.

If thermoforming is used, the flat sheet is passed (step 112) through the thermoformer 66. The corrugated (or flat) sheet is trimmed (step 114) by the edge trimmer 68, cut (step 116) to its final size by the cross cutter 70 on-line and stacked (step 1 18) by the stacker 72 on pallets for shipment.

It will be appreciated that the production system of FIG. 5 and the method of FIG. 6 can be used for the production of the polycarbonate sheet of FIG. 3, by adding the treated metal pigment flakes to the UV-protective PC compound instead of to the bulk PC material.

It will also be appreciated that the production system of FIG. 5 and the method of FIG. 6 can be used for the production of the polycarbonate sheet of FIG. 4, by excluding the co-extrusion of the UV-protective PC layer.

Reference is now made to Table 1, which is a comparison of the optical and solar properties of conventional clear and tinted polycarbonate roofing sheets and a PC sheet according to a preferred embodiment of the present invention. The first column lists the products being compared. Those sheets which are pigmented are characterized by the type of pigment and their visible light transmission. Sheets of pigmented solar control PC, in accordance with a preferred embodiment of the present invention, are listed in the last two rows. For each product, the following optical and solar properties are given: percentage of light transmission (%LT), percentage of solar transmission (%ST), percentage of solar reflection (%SR), percentage of solar absorption (%SA), and shading coefficient (SC)

TABLE 1

Solar Properties of Some Common Rooflight and Skylight Sheets

| Product | % LT | % ST | % SR | % SA | SC |
|---|---|---|---|---|---|
| Clear Polycarbonate (PC) | 90 | 86 | 10 | 4 | 1.0 |
| Transparent "Bronze" Tinted PC 35% (LT) | 35 | 42 | 6 | 52 | 0.64 |
| Transparent "Bronze" Tinted PC 20% | 20 | 28 | 6 | 66 | 0.52 |

TABLE 1-continued

Solar Properties of Some Common Rooflight and Skylight Sheets

| Product | % LT | % ST | % SR | % SA | SC |
|---|---|---|---|---|---|
| Transparent "Solar Gray" Tinted PC 35% | 35 | 42 | 6 | 52 | 0.64 |
| Transparent "Solar Gray" Tinted PC 20% | 20 | 27 | 6 | 67 | 0.51 |
| Opal (Diffused) White PC 45% | 45 | 46 | 43 | 11 | 0.56 |
| Opal (Diffused) White PC 35% | 35 | 40 | 47 | 13 | 0.50 |
| Surface Metallized Solar Control PC 35% | 35 | 35 | 17 | 48 | 0.54 |
| Surface Metallized Solar Control PC 20% | 20 | 18 | 28 | 54 | 0.37 |
| Pigmented Solar Control PC 35% | 35 | 32 | 28 | 40 | 0.49 |
| Pigmented Solar Control PC 20% | 20 | 18 | 30 | 52 | 0.37 |

The lower the shading coefficient (SC), the lower the heat gain inside the building. The sheets of pigmented solar control PC have the desired properties of controlled light transmission, high solar reflection, and low shading coefficient.

PC, PVC and PETG sheets have the added benefit of being impermeable to UV light, thus further reducing the shading coefficient.

It will be appreciated by persons skilled in the art that the present invention is not limited by what has been particularly shown and described herein above. Rather the scope of the invention is defined by the claims that follow.

What is claimed is:

1. A rigid light transmitting thermoplastic polymer sheet having an upper face, the sheet comprising:
   transparent thermoplastic polymer matrix having flakes of metal pigment embedded therein, said flakes being substantially evenly dispersed within said transparent thermoplastic polymer matrix and oriented coplanar with said upper face.

2. A sheet according to claim 1, wherein said thermoplastic polymer is one of a group including: polycarbonate (PC), polyvinylchloride (PVC), polymethylmethacrylate (PMMA), polysterene (PS) and polyethylenterphtalategly-col (PETG).

3. A sheet according to claim 1, wherein said sheet is one of a group comprising a flat sheet, a corrugated sheet and a multi-wall sheet.

4. A sheet according to claim 1, wherein said flakes have a diameter to thickness ratio in a range 100:1 and 10:1.

5. A sheet according to claim 1, wherein said flakes have a surface diameter between 5 to 50 microns and a thickness less than 5 microns.

6. A rigid light transmitting thermoplastic polymer sheet having an upper face comprising:
   a first transparent thermoplastic polymer layer;
   a second UV-protective transparent thermoplastic polymer layer co-extruded with said first layer, wherein said second layer is formed on top of said first layer; and
   metal pigment embedded within at least one of said first and second layers, said metal pigment being substantially evenly dispersed within said at least first and second layer and oriented co-planar with said upper face.

7. A sheet according to claim 6, wherein said metal pigment is dispersed within said first layer.

8. A sheet according to claim 6, wherein metal pigment is dispersed within said second layer.

9. A sheet according to claim 6, wherein said thermoplastic polymer sheet is one of a group including: PC, PVC, PMMA, PETG and PS.

10. A sheet according to claim 6, wherein said sheet is one of a group comprising a flat sheet, a corrugated sheet and a multi-wall sheet.

11. A sheet according to claim 6, wherein said sheet has an upper face and flakes of said metal pigment are oriented coplanar with said upper face.

12. A method for production of a rigid light transmitting thermoplastic polymer sheet having an upper face, the method comprising the steps of:
   treating metal pigment flakes thereby to increase their surface energy;
   feeding a transparent thermoplastic polymer material and said metal pigment flakes into an extrusion line, thereby forming a melt;
   extruding said melt through an extrusion die so that said metal pigment being embedded and substantially evenly dispersed within said melt and oriented co-planar with said upper face; and
   solidifying said melt into a rigid sheet.

13. A method according to claim 12, further comprising the step of thermoforming said rigid sheet.

14. A method according to claim 13, wherein said step of thermoforming is performed on-line.

15. A method according to claim 13, wherein said step of thermoforming is performed off-line.

16. A method according to claim 12, wherein said thermoplastic polymer material is one of a group including: PC, PVC, PMMA, PETG and PS.

17. A method for production of a rigid light transmitting thermoplastic polymer sheet having an upper face, the method comprising the steps of:
   treating metal pigment flakes thereby to increase their surface energy;
   feeding a first transparent thermoplastic polymer material into a first extrusion line;
   feeding a second transparent thermoplastic polymer material into a second extrusion line;
   feeding said metal pigment flakes into at least one of said first and second extrusion lines;
   co-extruding said first thermoplastic polymer material and said second thermoplastic polymer material into a melt, whereby said second thermoplastic polymer material forms a layer on said first thermoplastic polymer material;
   extruding said melt through an extrusion die so that said metal pigment being embedded and substantially evenly dispersed within said melt and oriented co-planar with said upper face; and
   solidifying said melt into a rigid sheet.

18. A method according to claim 17, further comprising the step of thermoforming said rigid sheet.

19. A method according to claim 18, wherein said step of thermoforming is performed on-line.

20. A method according to claim 18, wherein said step of thermoforming is performed off-line.

21. A method according to claim 17, wherein said first thermoplastic polymer material is one of a group including; PC, PVC, PMMA, PETG and PS.

22. A method according to claim 17, wherein said second thermoplastic polymer material is one of a group including: PC, PVC, PMMA, PETG and PS.

* * * * *